(No Model.)

G. W. WALKER.
LOOP PIPE FOR RADIATORS.

No. 353,900. Patented Dec. 7, 1886.

Witnesses

Inventor
George W. Walker,
by Crosby & Gregory attys

UNITED STATES PATENT OFFICE.

GEORGE W. WALKER, OF MALDEN, MASSACHUSETTS.

LOOP-PIPE FOR RADIATORS.

SPECIFICATION forming part of Letters Patent No. 353,900, dated December 7, 1886.

Application filed March 31, 1885. Serial No. 160,778. (No model.)

*To all whom it may concern:*

Be it known that I, GEORGE W. WALKER, of Malden, county of Milddlesex, State of Massachusetts, have invented an Improvement in Loop-Pipes for Radiators, of which the following description, in connection with the accompanying drawings, is a specification, like letters on the drawings representing like parts.

Loop-pipes employed in steam-radiators are screwed into the base singly, one at a time. These loop-pipes are frequently used three or more rows screwed into one base, and so, also, the loop-pipes are screwed into a circular base, wherein loop-pipes are arranged within an outer circle of loop-pipes. When, by reason of leakage, breakage, or for any reason, one of the interior loop-pipes in a radiator having three rows of pipes has to be removed from within a circle of pipes of a circular radiator, the pipes adjacent to it have to be removed before the said central pipe can be properly caught to be moved or unscrewed. To obviate removing any but the desired pipe, I have provided the upper end of the loop-pipe with an irregular engaging head, which may be caught by a suitable wrench or tool, thus enabling the said pipe to be readily turned without disturbing any other pipe. The engaging head referred to enables the pipes to be more readily turned into place than if said head were omitted from the pipe.

Figure 1:
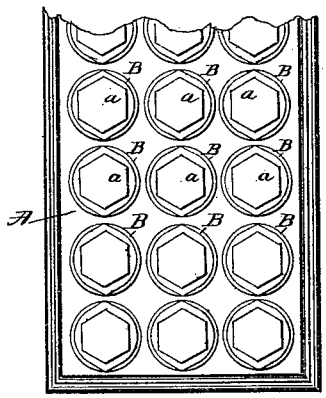
Figure 2:
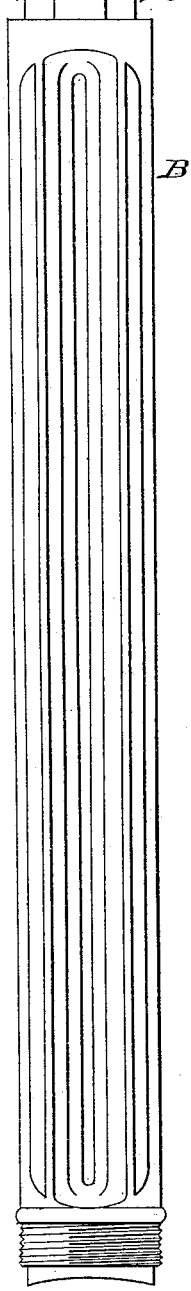
Figure 3:
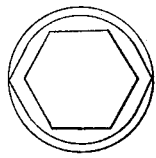

Figure 1, in top view, shows part of a radiator having three rows of loop-pipes; Fig. 2, an enlarged view of one of the pipes removed, and Fig. 3 a top view of Fig. 2.

The base A of the radiator has three rows of loop-pipes B. The upper ends of the pipes have cast integral with them engaging heads $a$, many-sided or angular in cross-section, to enable the said head to be readily engaged by a wrench or equivalent when it is desired to rotate one of the said pipes to remove it from or to attach it to the said base. With loop-pipes as now made, those pipes in the outer rows may be easily grasped by hand or by tongs when it is desired to rotate them, but not so when it is desired to rotate a pipe in a central row of pipes or surrounded on all sides by other pipes; but under such conditions, if the pipe has an engaging head at its upper end, said head may be securely grasped by a wrench or equivalent device and be removed or inserted without disturbing the connection with the base A of any of the other surrounding or adjacent pipes, which is a matter of very great convenience, and frequently saves very considerable time.

The head $a$ shown is hexagonal; but it might be triangular, quadrangular, or octagonal.

I am aware that a radiator-pipe has been made octagonal externally, as in United States Patent No. 287,770, and such I do not claim.

I claim—

A radiator-pipe, B, provided with the angular head $a$, projecting from one end of the body of the pipe, to afford a wrench-seat for removing each pipe independently of the others from the radiator, substantially as shown and described.

In testimony whereof I have signed my name to this specification in the presence of two subscribing witnesses.

GEO. W. WALKER.

Witnesses:
GEO. W. GREGORY,
F. CUTTER.